US008301137B1

(12) United States Patent
Farley et al.

(10) Patent No.: US 8,301,137 B1
(45) Date of Patent: Oct. 30, 2012

(54) METHOD AND APPARATUS FOR WIRELESS ROUTER MULTICAST

(75) Inventors: Kevin L. Farley, Melbourne Beach, FL (US); Leslie M. Brooks, West Melbourne, FL (US)

(73) Assignee: InterDigital Patent Corporation, Wilmington, DE (US)

( * ) Notice: Subject to any disclaimer, the term of this patent is extended or adjusted under 35 U.S.C. 154(b) by 1143 days.

(21) Appl. No.: 09/630,024

(22) Filed: Jul. 31, 2000

(51) Int. Cl.
*H04W 4/00* (2009.01)
(52) U.S. Cl. ......... 455/434; 455/518; 455/450; 455/453
(58) Field of Classification Search .................. 455/518, 455/519, 520, 521, 445, 434, 450, 453; 370/342; 714/4, 228
See application file for complete search history.

(56) References Cited

U.S. PATENT DOCUMENTS

| | | | | | |
|---|---|---|---|---|---|
| 5,361,256 | A | * | 11/1994 | Doeringer et al. | 370/390 |
| 5,387,905 | A | * | 2/1995 | Grube et al. | 340/825.52 |
| 5,583,866 | A | * | 12/1996 | Vook et al. | 370/312 |
| 5,655,215 | A | * | 8/1997 | Diachina et al. | 455/426.1 |
| 5,697,059 | A | | 12/1997 | Carney | |
| 5,930,248 | A | * | 7/1999 | Langlet et al. | 370/347 |
| 5,930,297 | A | | 7/1999 | Kaewell, Jr. et al. | |
| 5,943,331 | A | | 8/1999 | Lavean | |
| 5,953,346 | A | | 9/1999 | Luddy | |
| 5,995,538 | A | | 11/1999 | Lomp | |
| 6,128,490 | A | * | 10/2000 | Shaheen et al. | 455/434 |
| 6,141,347 | A | * | 10/2000 | Shaughnessy et al. | 370/390 |
| 6,188,911 | B1 | * | 2/2001 | Wallentin et al. | 455/524 |
| 6,266,782 | B1 | * | 7/2001 | Carter et al. | 714/4.3 |
| 6,307,837 | B1 | * | 10/2001 | Ichikawa et al. | 370/230 |
| 6,308,079 | B1 | * | 10/2001 | Pan et al. | 455/519 |
| 6,353,606 | B1 | * | 3/2002 | Hill et al. | 370/342 |
| 6,385,461 | B1 | * | 5/2002 | Raith | 455/518 |
| 6,456,627 | B1 | * | 9/2002 | Frodigh et al. | 370/465 |
| 6,477,149 | B1 | * | 11/2002 | Okanoue | 370/312 |
| 6,728,226 | B1 | * | 4/2004 | Naito | 370/328 |
| 6,738,350 | B1 | * | 5/2004 | Gao et al. | 370/232 |
| 6,804,528 | B1 | * | 10/2004 | Laroia et al. | 455/503 |
| 6,965,579 | B1 | | 11/2005 | Shin | |
| 2002/0019956 | A1 | * | 2/2002 | Carter et al. | 714/4 |
| 2003/0114177 | A1 | * | 6/2003 | Sinnarajah et al. | 455/515 |
| 2003/0223394 | A1 | * | 12/2003 | Parantainen et al. | 370/336 |

FOREIGN PATENT DOCUMENTS

| | | |
|---|---|---|
| WO | 99/44341 | 9/1999 |
| WO | WO99/44341 | 9/1999 |
| WO | 01/82645 | 1/2001 |
| WO | WO 01/82645 | * 1/2001 |

OTHER PUBLICATIONS

Fenner, W., "Internet Group Management Protocol, Version 2", RFC 2236, Nov. 1997, pp. 1-24.

(Continued)

*Primary Examiner* — Temesgh Ghebretinsae
*Assistant Examiner* — Richard Chan
(74) *Attorney, Agent, or Firm* — Volpe and Koenig, P.C.

(57) ABSTRACT

A technique for transmitting messages in a wireless communication network to a multicast group using a single wireless channel. A base station processor having a plurality of wireless channels is in communication with a plurality of subscriber access units in a wireless communication network. Multicast messages received by the base station processor are sent to a plurality of the subscriber access units, denoted as a multicast group, in the wireless communication network via a wireless channel dedicated to transmitting multicast messages.

28 Claims, 4 Drawing Sheets

OTHER PUBLICATIONS

Fenner, W. "Internet Group Management Protocol, Version 2", RFC 2236, Nov. 1997, pp. 1-24.

Deering, S. "Host Extensions for IP Multicasting", RFC 1112, Aug. 1989, pp. 1-15.

3rd Generation Partnership Project; Technical Specification Group Core Network; Packet Domain; Interworking between the Public Land Mobile Network (PLMN) supporting Packet Based Services and Packet Data Networks (PDN) (Release 1999) 3G TS 29.061 V3.3.0 (Mar. 2000).

GSM, Digital cellular telecommunications system (Phase 2+); General Packet Radio Service (GPRS); Point to Multipoint Multicast Service Description; Stage 2; (GSM 03.61), Jan. 1997.

3rd Generation Partnership Project; Technical Specification Group Radio Access Network; UE Procedures in Idle Mode (3G TS 25.304 V3.0.0) (Oct. 1999).

3rd Generation Partnership Project; Technical Specification Group Radio Access Network; UTRAN Overall Description, Release 1999 (3G TS 25.401 V3.2.0) (Mar. 2000).

3rd Generation Partnership Project; Technical Specification Group Radio Access Network; Radio Interface for Broadcast/Multicast Services, Release 1999 (3G TR 25.925 V3.1.0) (Mar. 2003).

3rd Generation Partnership Project; Technical Specification Group Radio Access Network; Radio Interface for Broadcast/Multicast Services, Release 1999 (3G TS25.324 V3.1.0) (Mar. 2000).

IEEE Standard for Local and metropolitan area networks; Part 16: Air Interface for Fixed Broadband Wireless Access Systems; IEEE Std. 802.16-2001.

* cited by examiner

METHOD AND APPARATUS FOR WIRELESS ROUTER MULTICAST

BACKGROUND OF THE INVENTION

In a telecommunications network, it is often desirable to send the same message to a group of recipients. Methods are known for establishing a group of message recipients as a multicast group. Such a group of recipients share a common group address for receiving messages sent to the multicast group. A message designated as a multicast message can then be sent to all members of the multicast group by simply addressing the message to the group address.

Message transmission in a telecommunications network occurs over a variety of physical media. For example, a telecommunications network may include wireless communication networks. Wireless communication networks are notable because message transmission occurs over a wireless connection via a radio channel, rather than via a physically conductive, or wired connection which is common in a telecommunications network. In a typical wireless communication network, a base station processor is in communication with a plurality of subscriber access units (subscribers). The base station processor also maintains a wired connection to the telecommunications network. Each of the subscriber access units is connected to a plurality of user computing devices, such as user PCs. In this manner, a user computing device is provided a wireless connection to a telecommunications network through the subscriber access unit and the base station processor in wireless communication with the subscriber access unit.

A base station processor includes a plurality of wireless channels for message transmission between the base station processor and the subscriber access units. Such wireless channels are a scarce resource in a base station processor. Accordingly, the base station processor allocates the wireless channels among the subscriber access units on a periodic basis as the users demand access.

A multicast message received by a base station processor may require delivery to a multiple of the subscriber access units which are members of a multicast group. In a typical base station processor, a separate channel is allocated for each of the subscriber access units that is a member of the multicast group. The multicast message therefore must be sent, in an iterative manner, to each of the subscriber access units over a separate dedicated channel allocated for each subscriber access unit. In this manner, a multicast message results in duplicate channel allocation and duplicate message transmission for each group member when a multicast message is received by the base station processor for delivery to each of the subscriber access units in the multicast group.

SUMMARY OF THE INVENTION

It would be beneficial, therefore, to provide a method and system for allocating a single channel for all subscriber access units that are members of a multicast group, and sending the message to all the subscriber access units over the single allocated channel for concurrent receipt by the subscriber access units that are members of the multicast group.

According to the invention, a system and method are provided to transmit messages in a wireless communication network to a multicast group. A base station processor having a plurality of wireless channels is in communication with a plurality of subscriber access units in a wireless communication network. The base station processor allocates the wireless channels to the subscriber access units for transmitting messages between the subscriber access units and the base station processor on a demand basis. The base station processor is also connected to a public access network such as the Internet via an Internet gateway. Multicast messages are received via the Internet gateway to be sent to a plurality of the subscriber access units, denoted as a multicast group, in the wireless communication network. The multicast message is sent concurrently to each of the subscriber access units by allocating a single wireless channel for the multicast message to all subscriber access units in the multicast group. The message is sent over the single wireless channel to all the subscriber access units in the multicast group and received concurrently by the subscriber access units in the multicast group.

A routing table stores entries associating subscriber access units with an interface; an interface is associated with a subscriber access units; and a wireless channel is associated with the interface. Multiple subscriber access units can therefore be associated with the same wireless channel used to send the multicast message. Subscriber access units which are members of a multicast group are associated with the same multicast group address in the routing table.

The multicast message traffic is determined by the base station processor which parses the incoming message traffic. The multicast message traffic conforms to a predetermined protocol such as the Internet Group Management Protocol (IGMP). Multicast message conforming to this protocol is used to identify multicast groups, identify requests for subscribers to leave and join the multicast groups, and determine which group a particular message is directed to.

BRIEF DESCRIPTION OF THE DRAWINGS

The foregoing and other objects, features and advantages will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
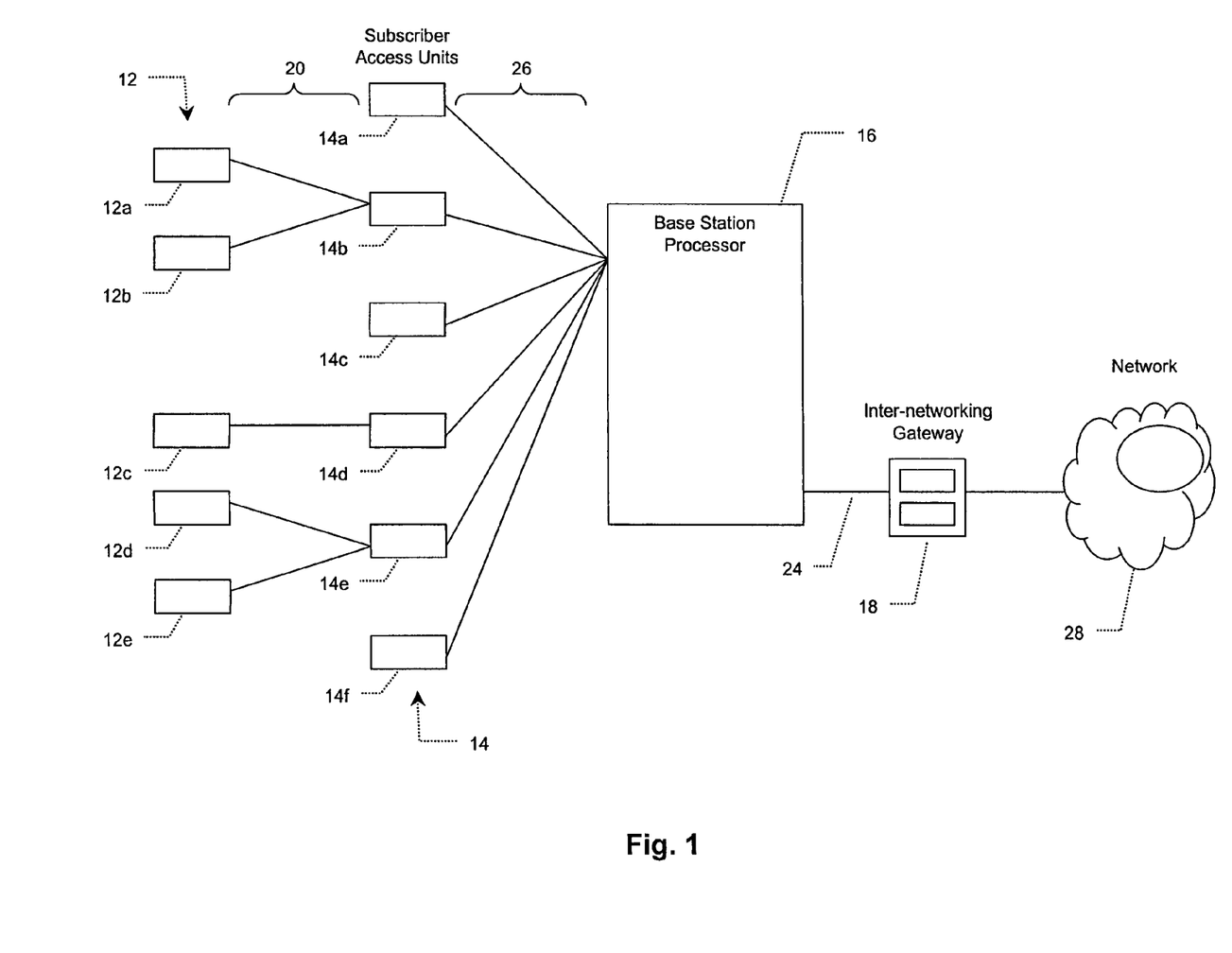
FIG. 1 is a block diagram of a wireless communication system suitable for performing multicast message transmission as defined herein.

A description of a preferred embodiment of the invention follows. FIG. 1 is a block diagram of a communication system 10 operable for multicast message transmission in a wireless network as defined herein. The communication system includes local computing devices, generally user PCs 12, subscriber access units 14, a base station processor 16, and an internetworking gateway 18. The user PCs 12 are in communication with the subscriber access units 14 via a wired connection 20. The subscriber access units 14 are in communication with a base station processor 16 via a wireless connection 26. The base station processor is in communication with an internetworking gateway 18 via a wired connection 24. The internetworking gateway 18 is adapted for communication via a public access network 28 such as the Internet.

The user PCs 12 may therefore be provided access to the internetworking gateway 18, which may be any remote entity located on the Internet or other network, through a combination of the wired 20, 24 and wireless connection 26 provided. The wired connection 20,24 is typically supported by a protocol such as TCP/IP or UDP/IP. The wireless connection is supported by a wireless link protocol such as IS95 or another wireless link protocol such as the protocol described in pending U.S. patent application entitled "Dynamic Frame Sizing Settings for Multichannel Transmission," published as PCT application No. WO 99/44341, Sep. 2, 1999.

Typically, the PC 12 provides a data packet, which may for example be an Internet Protocol (IP) packet, to the subscriber access unit 14 over the wired connection 20, which may for example be an Ethernet type connection. The subscriber access unit 14 removes the framing of the data packet and transfers the data in the data packet to the base station processor 16 over the wireless connection 26 in accordance with the wireless link protocol. The base station processor 16 extracts the wireless connection frames and forwards them, in data packet form, over the wired connection 24 to the internetworking gateway 18.

Similarly, packets sent from the public access network are sent to the base station processor 16 over the wired link 24, transmitted to the corresponding subscriber access unit 14 over the wireless link 26, and sent to the user PC 12 over the wired link 20. The subscriber access unit 14 and the base station processor 16 therefore denote endpoints of the wireless connection 26, providing a wireless link from the user PC 12 to the public access network 28 such as the Internet.

Figure 2:
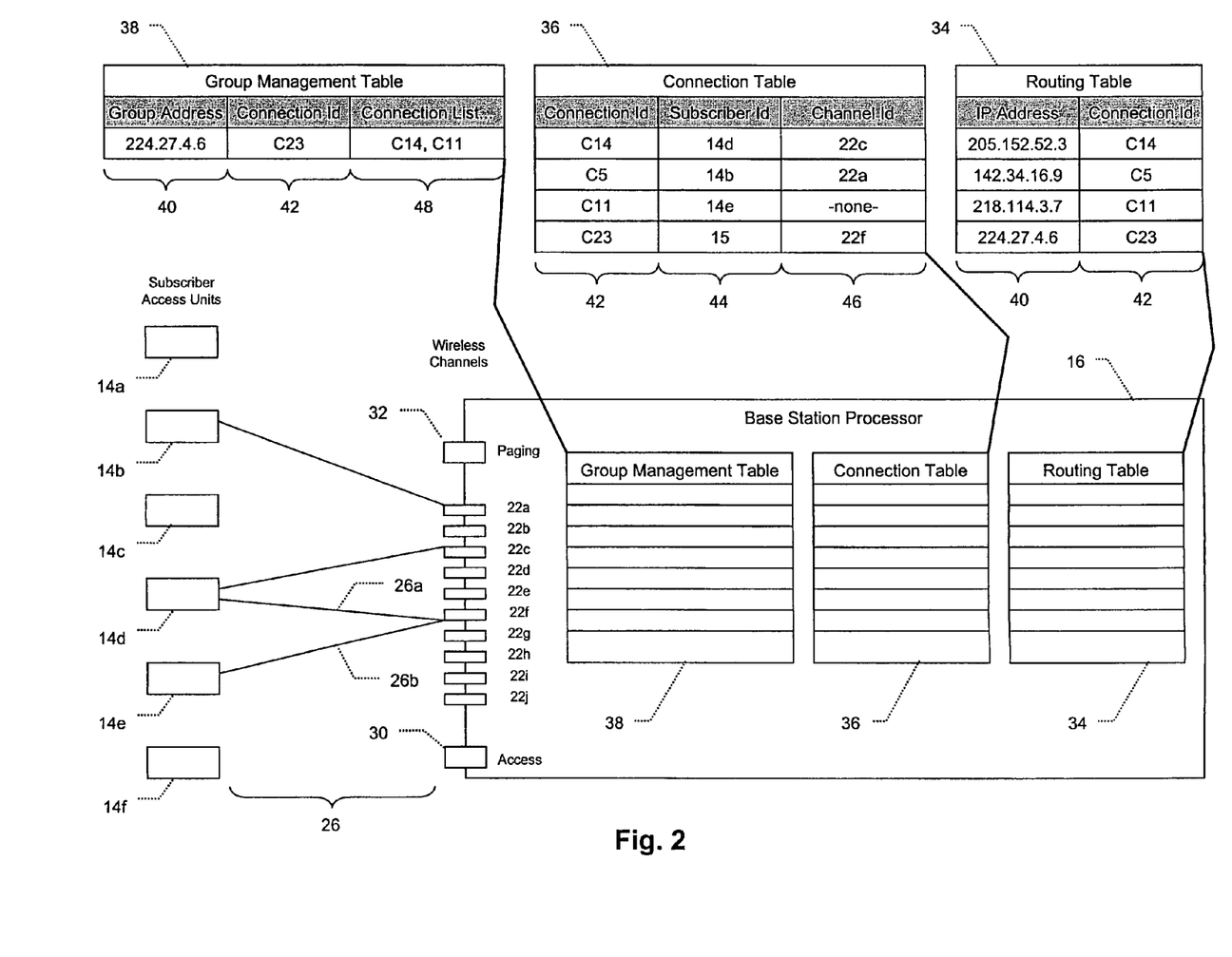
FIG. 2 shows a base station processor in communication with a plurality of subscriber access units.

FIG. 2 shows a base station processor in communication with a plurality of subscriber access units and operable to perform multicast message transmission as defined herein. Multicast messages are typically transmitted according to a protocol such as the Internet Group Management Protocol (IGMP), as defined in Internet RFC 2236. The base station processor 16 is in communication with a plurality of subscriber access units 14a-14f over a wireless connection 26. The base station processor 16 has a plurality of wireless channels 22a-22j (channels) operable to perform wireless communication between the subscriber access units 14 and the base station processor 16. The wireless channels 22 generally are allocated by the base station processor 16 to the subscriber access units 14 for sending and receiving wireless messages. Typically, the base station processor rapidly allocates and deallocates channels 22 to accommodate channel requests for messages sent between the subscriber access units 14 and the base station processor 16.

Typical wireless systems employ a shared paging and access method, common to all subscriber access units 14, that is used to provide communication with subscriber access units 14 when no dedicated wireless traffic channels 22 are allocated to send and receive messages. In such a system, a common paging channel 32 is used to notify a subscriber access unit 14 that it is being allocated a traffic channel 22. Also in such a system, a common access channel 30 is used by a subscriber access unit 14 to request a traffic channel 22 from the base station processor 16. Once traffic channels 22 are allocated, and the subscriber access unit 14 has been notified, the waiting messages are then forwarded by the subscriber access units 14 to the PC 12 or to the base station processor 16, depending on message direction.

In the example shown, described further below, channel 22c is allocated to subscriber access unit 14d on connection ID C14. Channel 22a is allocated to subscriber access unit 14b on connection ID C5. There are no channels allocated to subscriber access unit 14e on connection ID C11. Channel 22f is allocated to the multicast group indicated as subscriber ID 15 on connection ID C23. Connection ID C23 refers to a multicast group containing member connection IDs C14 and C11 which correspond to subscriber access units 14d and 14e respectively. The multicast message is sent via channel 22f, providing both wireless connections 26a and 26b, and is received concurrently by subscriber access units 14d and 14e, respectively. In this manner, multiple redundant message transmissions, each entailing a separate channel allocation, are avoided.

Referring in more detail to FIG. 2, the base station processor 16 has a routing table 34, a connection table 36, and a multicast group table 38. The routing table associates a network address 40, indicative of a user PC 12 (FIG. 1) with a connection ID 42. The connection table 36 associates connections with channels. For each connection ID 42, a corresponding channel ID 46 is stored. The subscriber ID 44 for which a channel 22 is allocated is also stored. For connection IDs 42 corresponding to multicast groups, a separate connection table 36 entry is maintained for each multicast group. Note that since the channels 22 are allocated on a demand basis as messages are received, the connection table 36 entries corresponding to a connection ID may be added and deleted as messages arrive and are sent on, as will be discussed further below. The group management table 38 associates a multicast group address 40 with a connection ID 42 and a list of group member connection IDs 48. Each connection ID 42 from the connection table 36 that is included in the membership of the multicast group indicated by multicast group address 40 is listed in the group member connection IDs 48. Note that since groups and group membership are dynamic, the group management table 38 entries may be added, deleted and updated as groups are formed and members join and leave the group as will be discussed further below.

Prior to discussing message transmission as indicated in FIG. 2, a brief discussion of channel allocation and message transmission using the base station processor 16 and the wireless protocol would be beneficial. As indicated above, the base station processor 16 allocates channels 22 among different subscriber access units 14 to accommodate message transmission requests. Each of the subscriber access units 14, therefore, is operable to receive a message over any of the channels 22 as determined by the base station processor 16. Since the wireless protocol used to transmit the message signals uses a non-selective RF medium, all the subscriber access units 14 are actually capable of processing the message signals, unlike a switched network in which only the intended recipient actually receives the message signals. Further, multiple channels 22 may be allocated to the same subscriber access unit 14. The connection table 36, therefore, stores the connection ID 42 and corresponding entry to indicate which subscriber access units 14 should process, or listen, to a particular channel 22. Note that the connection ID 42 may also be used to associate other connection parameters (not shown) used in conjunction with the wireless link protocol.

Typically, all subscriber access units 14 are responsive to the paging channel 32, as indicated above. When the base station processor 16 allocates a channel 22 to a subscriber access unit 14, a paging message is sent via the paging channel 32 to indicate to the subscriber access unit 14 that a message is about to be transmitted on a particular channel 22. For a unicast message, only a single subscriber access unit 14 is involved. Therefore, while all subscriber access units 14 will receive, demodulate and decode the paging message on the paging channel 32, only the subscriber access unit 14 indicated in the paging message need act on it. When the message indicated in the paging message is sent, only the subscriber access unit 14 indicated by the paging message will demodulate and decode the message. The other subscriber access units 14, while capable of receiving the RF signals carrying the message, will not decode and may need not fully demodulate the message because the paging message did not designate them.

During a multicast message transmission, multiple subscriber access units 14 process the message. Therefore, the corresponding paging message is indicative of the collection of the subscriber access units 14 in the multicast group to whom the message is directed. The group members may be indicated specifically by individual subscriber access unit reference, or by a group designator known to each of the subscriber access units 14 in the group. In this manner, the same channel 22 is used to transmit to multiple subscriber access units 14 because multiple subscriber access units 14 are told to receive, or listen, on the same channel 22.

Continuing to refer to FIG. 2, a multicast group address 40 corresponding to IP address 224.27.4.6 is listed in the routing table 34. The actual addresses used are exemplary and any suitable address supported by the underlying protocol, here TCP/IP, can be used. Consistent with the IGMP protocol indicated above, 224 is typically the first part of the network number for a multicast group. IP address 224.27.4.6 is associated with the connection ID C23 in column 42. The multicast group IP address 224.27.4.6 in column 40 and connection ID C23 in column 42 are associated in the group management table 38 with connection IDs C14 and C11 in the group connection list 48. The connection IDs C14 and C11 correspond to subscriber access units 14d and 14e respectively. In the example, connection ID 23 in column 42 is associated with subscriber access unit 15 in column 44. Subscriber access unit 15 is used as a designation of a multicast group user. This designation is exemplary and other suitable designations can be employed. As depicted in the connection table 36, connection ID C23 is allocated channel 22f. In the group management table 38, connection ID C23 is associated with group members having connection IDs C14 and C11. These two multicast connections are illustrated as wireless connections 26a and 26b, respectively.

Therefore, a multicast message sent to multicast group 224.27.4.6 results in the message being sent via channel 22f to both subscriber access unit 14d and 14e, because both subscriber access unit 14d and 14e are receiving, or listening, on channel 22f. Group establishment and the transmission of a multicast message will be described in more detail below.

Figure 3:
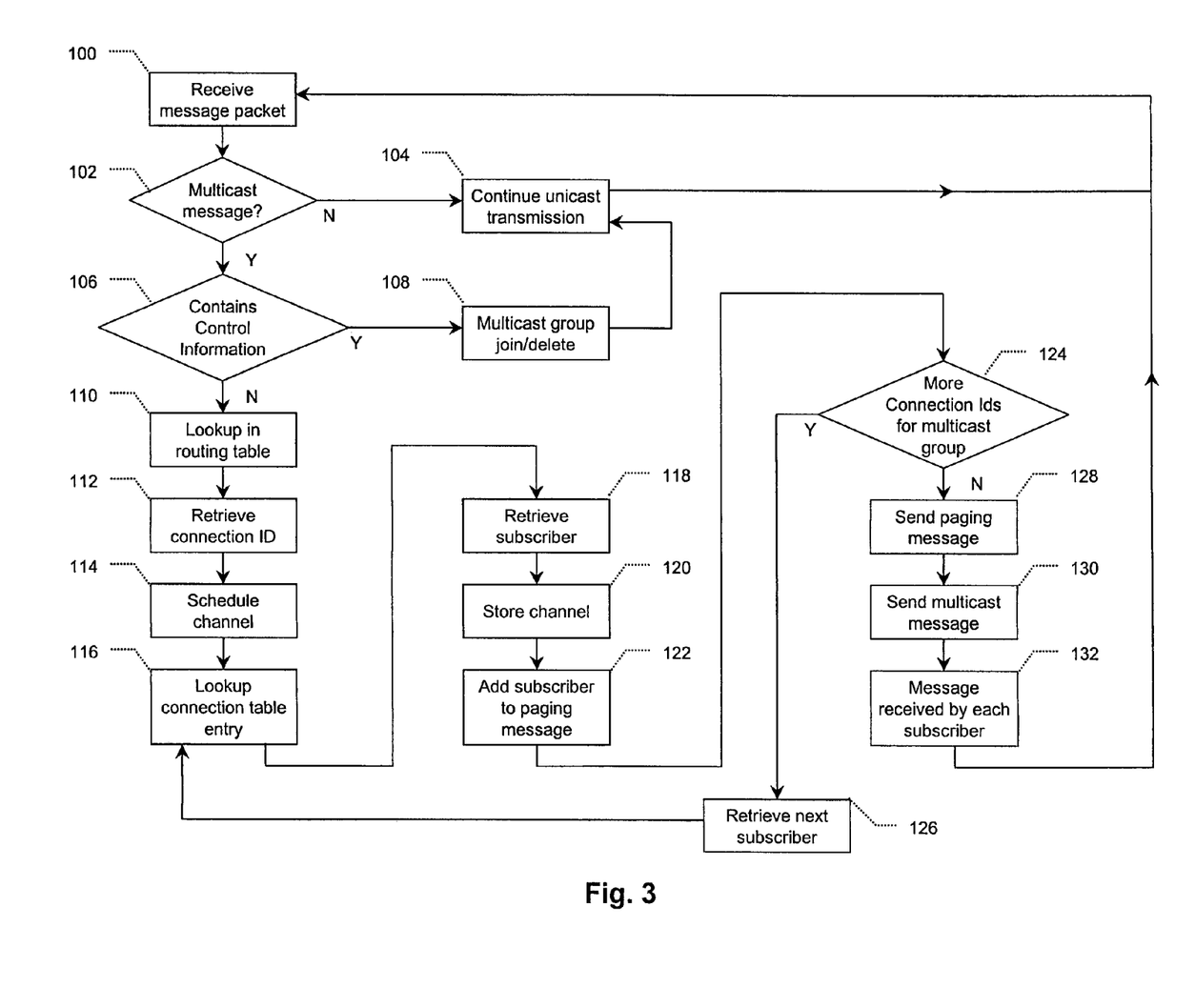
FIG. 3 is a flowchart depicting multicast message transmission as defined herein.

FIG. 3 shows a flowchart depicting the sequence of multicast message transmission processing. Referring to FIGS. 3 and 2, a message is received at the base station processor 16, as shown in step 100. A check is made to determine if the message is a multicast message, as depicted in step 102. If the message is not a multicast message, unicast transmission continues, as disclosed at step 104. If the message is a multicast message, a check is made to determine whether the message contains control information or data traffic, as depicted in step 106. Control information is indicative of new multicast groups and additions and deletions of group members. If the message contains control information, multicast group join/delete processing is performed, as shown at step 108. Otherwise, a lookup is performed in the routing table 34 to find the group address, as disclosed at step 110. The connection ID corresponding to the multicast group is retrieved, as shown at step 112. The connection ID corresponds to a group entry in the group management table 38. A channel 22 is scheduled to be used to transmit the message, as shown at step 114. For each connection ID corresponding to the group connection list in the group entry of the group management table 38, a lookup is performed to find an entry in the connection table 36, as disclosed at step 116. For each connection, the subscriber access unit corresponding to the connection is retrieved, as depicted at step 118. The channel 22 to be allocated to transmit the message is stored in the connection table 36, as indicated at step 120. The channel 22 and subscriber access unit 14 are then added to the paging message corresponding to the multicast message, as shown at step 122. A check is made to determine if all connection IDs corresponding to this multicast group have been processed, as shown at step 124. If there are more connection IDs corresponding to the group connection list 48 in the group entry in the group management table 38, control reverts to step 116 to process the additional connection IDs, as depicted at step 126. When all subscriber access units 14 corresponding to the multicast group have been implicated in the paging message, the paging message is sent, as disclosed at step 128. Following the paging message, the multicast message is sent over the channel 22 scheduled in step 114, as depicted at step 130. The message is received by each of the subscriber access units indicated in the paging message, as shown at step 132. In this manner, a single channel allocation and a single message transmission provide a message which is received by each of the subscriber access units 14 in the wireless multicast group.

Figure 4:
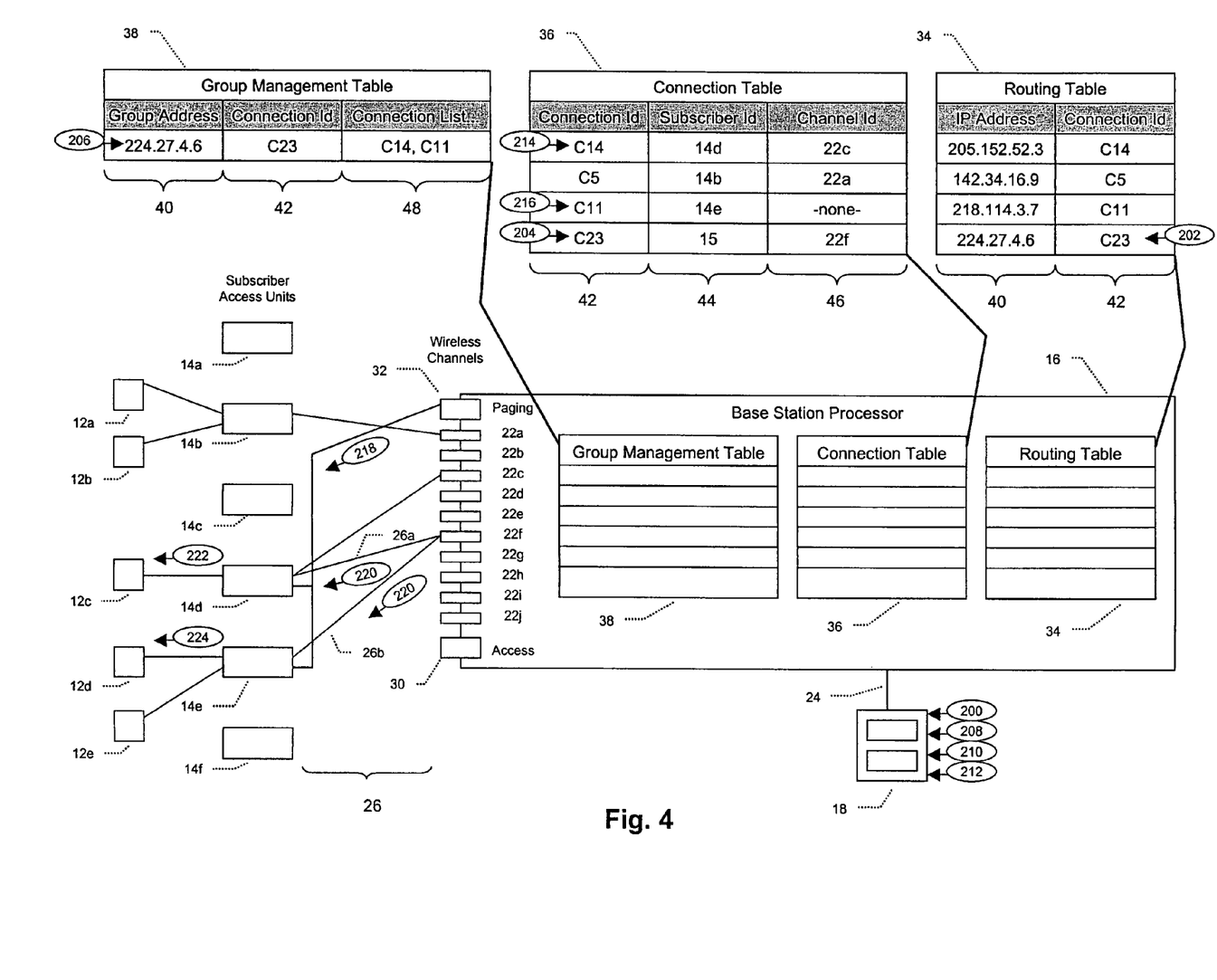
FIG. 4 shows the sequence of messages for establishing and transmitting to a multicast group.

FIG. 4 shows the sequence of messages used to establish and send multicast group messages in more detail. As indicated above, in one embodiment, multicast groups are defined by the IGMP protocol. IGMP messages are indicative of requests to add and delete groups and to add and delete group members, defined by an IP address, to and from a multicast group. Referring to FIG. 4, the base station processor 16 scans incoming messages for IGMP messages, and updates the routing table 34, the connection table 36, and the group management table 38 accordingly. Incoming messages from the Internet or other public access network are received by the base station processor 16 via the internetworking gateway 18. An add group message 200 is received by the base station processor 16 for the multicast group identified by IP address 224.27.4.6. An entry 202 is written to the routing table to identify the new multicast group address, and connection C23 is created and entry 204 is written to the connection table 36. Since this is a new group, an entry 206 is written to the group management table 38. As a multicast group may have zero or more members at any time, no members are yet established for this multicast group and the group connection list 48 stored in the group management table entry 206 is empty.

An add member to group message 208 is received, indicative of a request to add user PC 12d, served by subscriber access unit 14e, to the multicast group 224.27.4.6. More specifically, the add member request message is indicative of an IP address served by subscriber access unit 14e, since a single subscriber access unit 14 may serve many user PCs 12. The routing table 34 is scanned, and the entry 202 for multicast group 224.27.4.6 is found to exist. The routing table 34 indicates that connection ID C23 serves the multicast group 224.27.4.6. The group management table 38 is scanned, and the entry 206 for connection ID C23 is found to exist. User PC 12d has an associated IP address of 218.114.3.7. The routing table 34 is scanned for IP address 218.114.3.7, and the entry is found to exist associated with connection ID C11. The group management table 38 entry 206 is then updated to include connection ID C11 in the group connection list 48.

Another add member to group message 210 is received, indicative of a request to add user PC12c, served by subscriber access unit 14d to the multicast group 224.27.4.6. The routing table 34 again indicates that connection ID C23 is associated with this multicast group. The group management table 38 is scanned, and the entry 206 for connection ID C23 is found to exist. User PC 12c has an associated IP address of 205.152.52.3. The routing table 34 is scanned for IP address 205.152.52.3, and the entry is found to exist associated with connection ID C14. The group management table 38 entry 206 is then updated to include connection ID C14 in its connection list.

As indicated above in FIG. 3, the wireless channels 22 are allocated on demand as needed for messages. Accordingly, connection entries in the connection table 36 need not indicate that any traffic channels are allocated for a particular connection, including the multicast group connection. A message 212 is received at the base station processor 16 for the multicast group 224.27.4.6. A lookup in the routing table 34 indicates entry 202, referencing the connection ID C23. Mapping the connection ID C23 into the group management table 38 yields two connections corresponding to members of the multicast group as indicated by entry 206. Multiple connections identified in the connection list of the group management table 38 entry are indicative of a multicast group. Connections C14 and C11 denote subscriber access units 14d and 14e, respectively, as members of the multicast group. A channel request to deliver the multicast message allocates channel 22f for this multicast message. Accordingly, connection table 36 entry 204 is updated with the allocated channel ID 22f. A paging message 218 is created to alert subscriber access units 14d and 14e to receive on channel 22f, and sent on the paging channel 32 to subscriber access units 14d and 14e, respectively. After receipt of the paging message by the subscriber access units 14d and 14e, the multicast message 220 is sent on the allocated channel 22f. Subscriber access units 14d and 14e will send the received multicast message over the wired connection 20 to user PCs 12c and 12d, respectively, as indicated by messages 222 and 224. In a typical messaging session, the subscriber access units 14 in a multicast group may each receive many multicast messages in sequence. These messages may be segmented to correspond to portions of packets or the entire packet as received from the internetworking gateway 18. It is possible that not all the subscriber access units 14 in a multicast group will correctly receive the message on the wireless channels, due, for example, to interference or other transmission aspects common to the medium which supports the wireless connection. In another embodiment, each message is associated with a sequence number. Referring again to FIG. 4, in this embodiment, each subscriber access unit 14 which does not receive the multicast message correctly sends a negative acknowledgment back to the base station processor 16. If one or more negative acknowledgments are received at the base station processor 16, the base station processor 16 will resend the message in a manner similar to the original wireless multicast transmission, on either the same channel or a newly allocated channel. Subscriber access units 14 which did correctly receive the message will recognize the sequence number as having been received already, and will ignore the message, so that duplicate messages are avoided.

It should be noted that exemplary IGMP messages are described herein, and that other messages and protocols exist which are indicative of requests to create and delete multicast groups, and to join and remove members from the multicast groups. Such messages include, but are not limited to, group query, group member list, join host group, leave host group, and others. The system and methods described herein are illustrative of the notion that a wired line multicast group protocol, such as IGMP used in a TCP/IP network, can be employed in a base station processor to provide efficient multicast group transmission in a wireless network. Through examining the group management messages in the base station processor as defined herein, wireless channels, wireless connections, and wireless interfaces can be employed in an optimal manner.

Those skilled in the art should readily appreciate that the programs defining the operations and methods defined herein are deliverable to a base station processor in many forms, including but not limited to a) information permanently stored on non-writeable storage media such as ROM devices, b) information alterable stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While the system and method for transmitting multicast messages in a wireless communication network have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method implemented in a subscriber unit, wherein a multicast group comprises a plurality of subscriber units, the method comprising:
    receiving a multicast group indication message, from a base station, via a first one of a plurality of wireless channels, the multicast group indication message identifying a connection identifier associated with a multicast message, wherein the connection identifier is associated with an indication of a second one of the plurality of wireless channels over which to receive the multicast message from the base station;
    receiving the multicast message via the second one of the plurality of wireless channels;
    transmitting a negative acknowledgment; and
    receiving a retransmission of the multicast message in response to the transmitted negative acknowledgement.

2. The method of claim 1 further comprising:
    receiving the multicast message concurrently with other subscriber units in the multicast group.

3. The method of claim 1 wherein the second one of the plurality of wireless channels is a dedicated channel.

4. The method of claim 1 wherein only a subscriber unit associated with the multicast group decodes the multicast message received over the second wireless channel.

5. A method of transmitting multicast messages, wherein a multicast group comprises a plurality of subscriber units, the method comprising:
    transmitting a multicast group indication message, from a base station, via a first one of a plurality of wireless channels, the multicast group indication message identifying a connection identifier associated with a multicast message, wherein the connection identifier is associated with an indication of a second one of the plurality of wireless channels over which a corresponding multicast message will be transmitted from the base station; and transmitting the multicast message, from the base station, to the multicast group via the second one of the plurality of wireless channels;

receiving a negative acknowledgment from a subscriber unit associated with the multicast group; and retransmitting the multicast message.

6. The method of claim 5 further comprising:
performing a lookup in a routing table adapted to store entries associating a multicast group with the connection identifier; and
performing a lookup in a table adapted to associate the connection identifier with the at least one subscriber unit.

7. The method of claim 5 further comprising:
receiving a join group request from a subscriber unit; and
adding an entry in the table indicative of an association between the multicast group and the subscriber unit.

8. The method of claim 5 further comprising:
scanning the multicast message; and
parsing a group address in response to a determination that the multicast message is directed to the multicast group.

9. The method of claim 8 wherein the group address conforms to a protocol and the multicast message is parsed in accordance with the protocol.

10. The method of claim 9 wherein the protocol is the Internet Group Management Protocol (IGMP).

11. The method of claim 5 wherein the first one of the plurality of wireless channels is a dedicated channel.

12. The method of claim 5, wherein the retransmitting the multicast message includes retransmitting the multicast message via a third one of the plurality of channels.

13. A subscriber unit comprising:
a receiver configured to:
receive a multicast group indication message, from a base station, via a first one of a plurality of wireless channels, the multicast group indication message identifying a connection identifier associated with a multicast message, therein the connection identifier is associated with an indication of a second one of the plurality of wireless channels over which to receive a corresponding multicast message; and
receive the multicast message, from the base station, via the second one of the plurality of wireless channels; and
a transmitter configured to transmit a negative acknowledgement; and
wherein the receiver is further configured to receive a retransmission of the multicast message in response to the transmitted negative acknowledgement.

14. The subscriber unit of claim 13 wherein the second one of the plurality of wireless channels is a dedicated channel.

15. A base station for multicasting messages, the base station comprising:
a processor configured to receive a multicast message addressed to a multicast group having two or more subscriber units;
a transmitter configured to:
transmit a multicast group indication message to a multicast group via a first one of a plurality of wireless channels, the multicast group indication message identifying a connection identifier associated with a multicast message, wherein the connection identifier is associated with an indication of a second one of the plurality of wireless channels over which a corresponding multicast message will be transmitted; and
transmit the multicast message, to the multicast group, via the second one of the plurality of wireless channels; and
a receiver configured to receive a negative acknowledgment from a subscriber unit associated with the multicast group;
wherein the transmitter is further configured to retransmit the multicast message in response to the negative acknowledgement.

16. The base station of claim 15 wherein:
the processor is further configured to perform a lookup in a routing table adapted to store entries associating a multicast group with the connection identifier; and to perform a lookup in a table adapted to associate the connection identifier with the at least subscriber units.

17. The base station of claim 16, further comprising:
a receiver configured to receive a join group request from a subscriber unit;
wherein the processor is further configured to add an entry in the table indicative of an association between the multicast group and the subscriber unit.

18. The base station of claim 15 wherein the processor is further configured to scan the multicast message; and to parse a group address in response to a determination that the multicast message is directed to the multicast group.

19. The base station of claim 18 wherein the group address conforms to a protocol and the multicast message is parsed by the processor in accordance with the protocol.

20. The base station of claim 19 wherein the protocol is the Internet Group Management Protocol (IGMP).

21. The base station of claim 20 wherein the first one of the plurality of wireless channels is a dedicated channel.

22. The base station of claim 15,
wherein the transmitter is configured to retransmit the multicast message via the second one of the plurality of wireless channels in response to the negative acknowledgement.

23. The method of claim 1,
wherein the retransmission of the multicast message is received via the second one of a plurality of wireless channels.

24. The subscriber unit of claim 13, wherein the receiver is configured to receive the retransmission of the multicast message via the second one of the plurality of wireless channels in response to the transmitted negative acknowledgement.

25. The method of claim 1, wherein the retransmission of the multicast message is received via a third one of a plurality of wireless channels.

26. The method of claim 5, wherein the retransmitting the multicast message includes retransmitting the multicast message via the second one of the plurality of channels.

27. The subscriber unit of claim 13, wherein the receiver is configured to receive the retransmission of the multicast message via a third one of the plurality of wireless channels in response to the transmitted negative acknowledgement.

28. The base station of claim 15, wherein the transmitter is configured to retransmit the multicast message via a third one of the plurality of wireless channels in response to the negative acknowledgement.

* * * * *